US012211011B2

(12) United States Patent
Emoto et al.

(10) Patent No.: US 12,211,011 B2
(45) Date of Patent: Jan. 28, 2025

(54) INFORMATION PROCESSING APPARATUS, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventors: Mitsuteru Emoto, Toyota (JP); Masakazu Shinkai, Toyota (JP); Yusuke Matsukawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 267 days.

(21) Appl. No.: 17/933,161

(22) Filed: Sep. 19, 2022

(65) Prior Publication Data

US 2023/0131082 A1    Apr. 27, 2023

(30) Foreign Application Priority Data

Oct. 27, 2021    (JP) .................................. 2021-175218

(51) Int. Cl.
*G06Q 30/00* (2023.01)
*G06F 8/65* (2018.01)
*G06Q 10/20* (2023.01)

(52) U.S. Cl.
CPC .............. *G06Q 10/20* (2013.01); *G06F 8/65* (2013.01)

(58) Field of Classification Search
CPC .... G06Q 10/20; G06Q 30/0639; G06Q 10/08; G06Q 30/0635; G06F 8/65; G06F 11/3664
See application file for complete search history.

(56) References Cited

U.S. PATENT DOCUMENTS

| 10,540,529 | B1* | 1/2020 | Bondarenko | G06Q 10/20 |
| 10,728,237 | B2* | 7/2020 | DeBickes | G06F 21/57 |
| 2004/0113815 | A1* | 6/2004 | Newcomer | B62D 15/00 |
| | | | | 340/932.2 |
| 2005/0143883 | A1* | 6/2005 | Yamagiwa | G06Q 10/06 |
| | | | | 701/29.6 |
| 2006/0097057 | A1* | 5/2006 | Porad | G06K 19/0776 |
| | | | | 235/492 |
| 2006/0211572 | A1* | 9/2006 | Yukawa | B32B 27/08 |
| | | | | 503/227 |
| 2007/0044354 | A1* | 3/2007 | Hiramoto | G09F 3/04 |
| | | | | 40/124.13 |

(Continued)

FOREIGN PATENT DOCUMENTS

JP    2005-346170 A    12/2005

OTHER PUBLICATIONS

Toyota Motor Seeks Patent for Information Processing Apparatus, Information Processing Method, and Non-Transitory Storage Medium, Global IP News. Information Technology Patent News [New Delhi] Nov. 28, 2023. (Year: 2023).*

(Continued)

*Primary Examiner* — Matthew T Sittner
(74) *Attorney, Agent, or Firm* — Oblon, McClelland, Maier & Neustadt, L.L.P.

(57) ABSTRACT

A controller is provided that determines, in response to an order for a sticker indicating that a predetermined part of a vehicle has been upgraded, the number of issues of the sticker according the predetermined part.

6 Claims, 13 Drawing Sheets

(56) References Cited

U.S. PATENT DOCUMENTS

| | | | | |
|---|---|---|---|---|
| 2011/0039215 A1* | 2/2011 | Kim | ............................ | G09F 3/02 |
| | | | | 427/150 |
| 2012/0288312 A1* | 11/2012 | Seki | ........................ | B41J 3/4075 |
| | | | | 400/76 |
| 2014/0135042 A1* | 5/2014 | Buchheim | ................ | G01S 1/725 |
| | | | | 455/566 |
| 2018/0022113 A1* | 1/2018 | Tashiro | ........................ | B41J 3/36 |
| | | | | 347/211 |
| 2018/0114468 A1* | 4/2018 | Wolff | ...................... | G09F 3/0294 |
| 2020/0090511 A1* | 3/2020 | Tao | .................... | B60W 30/0956 |
| 2022/0230487 A1* | 7/2022 | Saal | ...................... | G07C 5/0825 |

OTHER PUBLICATIONS

State Intellectual Property Office of China Publishes Toyota Motor's Patent Application for Information Processing Apparatus, Information Processing Method and Non-Transitory Storage Medium, Global IP News. Information Technology Patent News [New Delhi] Dec. 1, 2023. (Year: 2023).*

"For inspected stickers, sticker printing, sticker printing, and label creation, we offer sticker direct delivery service," Sticker Direct Delivery [online], Jun. 20, 2021, <URL:http://web.archive.org/web/20210620061047/https://weblabels.net/seal/type_list?category_id=274> (with unedited computer-generated English translation).

\* cited by examiner

UPGRADED

| VEHICLE ID | USER ID | FACTORY ID | CHASSIS NUMBER | UPGRADE HISTORY |
|---|---|---|---|---|
| V001 | × × × | × × × | × × × | × × × |
| V002 | × × × | × × × | × × × | × × × |
| V003 | × × × | × × × | × × × | × × × |
| ... | ... | ... | ... | ... |

Fig. 7

| PART NUMBER | NUMBER OF ISSUES OF STICKER |
|---|---|
| P001 | 1 |
| P002 | 2 |
| P003 | 1 |
| . . . | . . . |

Fig. 8

INFORMATION PROCESSING APPARATUS, INFORMATION PROCESSING METHOD, AND NON-TRANSITORY STORAGE MEDIUM

CROSS REFERENCE TO THE RELATED APPLICATION

This application claims the benefit of Japanese Patent Application No. 2021-175218, filed on Oct. 27, 2021, which is hereby incorporated by reference herein in its entirety.

BACKGROUND

Technical Field

The present disclosure relates to an information processing apparatus, an information processing method, and a non-transitory storage medium storing a program.

Description of the Related Art

The evaluation of used vehicles is known to vary based on options, equipment, etc. In this connection, Patent Literature 1 has disclosed a system in which the history of a vehicle sold as a used vehicle (such as the replacement history of parts, maintenance history, etc.) is registered in a server device and provided to consumers.

CITATION LIST

Patent Literature

Patent Literature 1: Japanese Patent Application Laid-Open Publication No. 2005-346170

SUMMARY

The object of the present disclosure is to make the history of a vehicle easier to understand.

One aspect of the present disclosure is directed to an information processing apparatus including a controller configured to determine, in response to an order for a sticker indicating that a predetermined part of a vehicle has been upgraded, the number of issues of the sticker according to the predetermined part.

Another aspect of the present disclosure is directed to an information processing method for causing a computer to determine, in response to an order for a sticker indicating that a predetermined part of a vehicle has been upgraded, the number of issues of the sticker according to the predetermined part.

A further aspect of the present disclosure is directed to a non-transitory storage medium storing a program configured to cause a computer to determine, in response to an order for a sticker indicating that a predetermined part of a vehicle has been upgraded, the number of issues of the sticker according to the predetermined part.

A still further aspect of the present disclosure is directed to the program described above.

According to the present disclosure, it is possible to make the history of the vehicle easier to understand.

BRIEF DESCRIPTION OF THE DRAWINGS

FIG. 2 is a view illustrating an example of a sticker;

FIG. 7 is a view illustrating an example of a table configuration of a vehicle information DB;

FIG. 8 is a view illustrating an example of a table configuration of a number of issues information DB;

DESCRIPTION OF THE EMBODIMENTS

Figure 1:
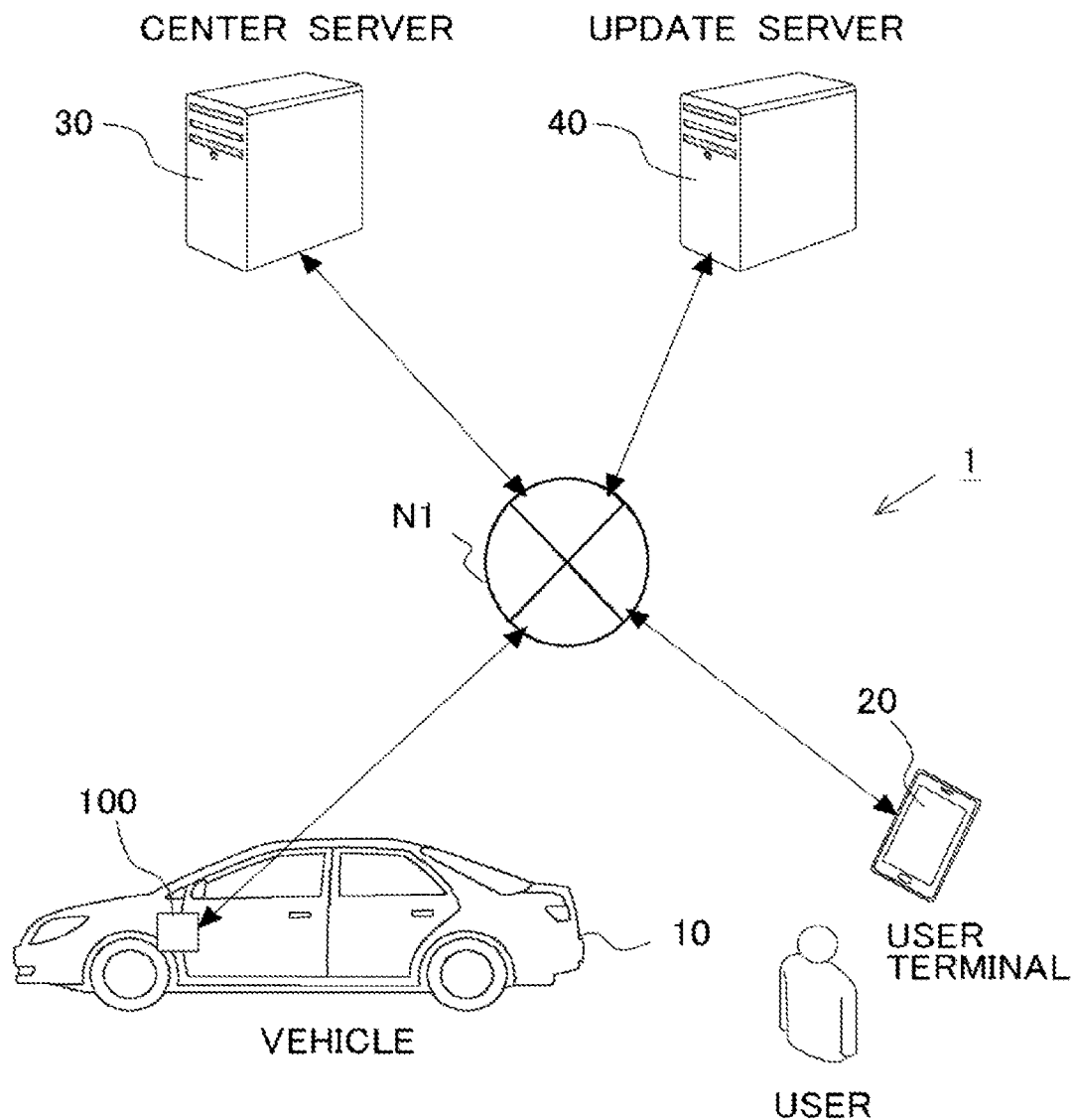
FIG. 1 is a view illustrating a schematic configuration of a system according to an embodiment.

There is a technique for ex-post replacing or updating parts included in a vehicle (vehicle parts). For example, seats are changed from cloth to leather, or a steering wheel is changed to one with a built-in heater. In addition, by updating software on an in-vehicle computer, it will be possible to add functions (such as safety-related functions, driving support functions, etc.) that were not installed when the new vehicle was sold. In the present disclosure, the term "upgrade" refers to making vehicle parts more sophisticated or higher in quality by replacing parts or updating software.

When the vehicle parts are upgraded, the value of the used vehicle is increased. Therefore, it is preferable for the vehicle manufacturer to certify that the upgrade was made through an official program. For example, by attaching a certificate to a maintenance notebook of a vehicle, it can be demonstrated at the time the vehicle is sold that the upgrade was made with genuine parts. The certification can also be made by means of a sticker. For example, by attaching, to the vehicle body, a sticker indicating that any of the vehicle parts included in the vehicle has been upgraded, it becomes possible to determine at a glance whether or not there has been an upgrade.

Here, the position at which the sticker is to be attached can also be determined at a predetermined position of the vehicle. The predetermined position may be a place easily visible to the user such as, for example, a center pillar (which may also be a B pillar) or the like. On the other hand, in cases where the software on the in-vehicle computer is updated, it will be necessary to perform work corresponding to the software at the time of replacement or inspection of the in-vehicle computer. Therefore, a sticker may be attached to the housing of the in-vehicle computer so as to make it easier to understand at the time of work that the software on the in-vehicle computer has been updated. In addition, when the vehicle body is processed, a sticker may be attached to a processed place or a place in the immediate vicinity of the processed place in order to guarantee the quality of the processing.

In cases where a sticker is attached to or near an upgraded vehicle part, the sticker may be attached to a position hidden in the interior or may be attached to an outer surface of the floor of the vehicle. In such cases, even if the sticker is attached, it cannot be seen from the outside, and hence, it may be difficult to check whether or not the vehicle part has been upgraded. An information processing apparatus, which is one of the aspects of the present disclosure, solves such problems.

The information processing apparatus according to one aspect of the present disclosure includes a controller. In response to an order for a sticker indicating that a predetermined part of a vehicle has been upgraded, the controller determines the number of issues of the sticker according to the predetermined part. For example, the controller may determine that the sticker has been ordered, not only in cases where the user directly orders the sticker, but also in cases where a situation arises that requires the sticker to be attached. For example, it may be determined that the sticker has been ordered, based on the fact that the user has performed an action of ordering the sticker, the fact that the user has placed an order for the vehicle part, the fact that the user has upgraded the vehicle part, the fact that the vehicle part has been upgraded without depending on the user, or the like. For example, in cases where the software update of the in-vehicle computer is performed by using wireless communication, it may be considered that the sticker has been ordered based on the fact that the software update has been performed. In addition, a server or the like that has performed the software update may place an order for the sticker. Further, in cases where the user orders a vehicle part for upgrade, it may be treated as if an order for a sticker were also made. The controller may receive the order for the sticker from a user terminal, an in-vehicle device, a computer that manages the upgrade of the vehicle part, or the like.

The predetermined part is a part that can be upgraded. The upgrade of the predetermined part can include an upgrade of hardware and an upgrade of software. Note that in cases where the software on the in-vehicle computer has been updated, it may be considered that the software has been upgraded, or it may be considered that the in-vehicle computer has been upgraded. In addition, the upgrade can include modification of the vehicle body, replacement of parts, and new installation of parts.

The sticker is a certification associated with the vehicle part. The sticker includes information indicating that the predetermined part has been upgraded. For example, the name of the predetermined part, the content of the upgrade, or the like may be described. Alternatively, a two-dimensional code corresponding to the name of the predetermined part, the content of the upgrade, or the like may be printed, or an electronic tag corresponding to the name of the predetermined part, the content of the upgrade, or the like may be embedded. Note that the sticker may be a laminated piece of paper, a metal plate, or the like.

The number of issues of the sticker is associated with the predetermined part. The position at which each piece of the sticker is attached varies depending on the predetermined part, and the number of issues of the sticker varies depending on the position at which each piece of the sticker is attached. For example, in cases where the sticker is attached in such a manner that it can be easily checked from the outside, the controller can determine the number of issues of the sticker to be one. On the other hand, for example, in cases where the sticker is attached in such a manner that it cannot be easily checked from the outside, the controller can determine the number of issues of the sticker to be two. One piece of the sticker for which the number of issues is determined to be two is to be attached to a place that can be easily checked from the outside. As a place that can be easily checked from the outside, there can be mentioned, for example, a center pillar. Here, note that the number of issues of the sticker is not limited to one or two, but may be three or more.

In this way, in cases where one piece of the sticker is attached to the place that cannot be easily seen from the outside, the upgrade of the vehicle part can be easily checked if another piece of the sticker is issued and attached to a location that can be easily seen from the outside.

Here, note that in cases where the number of issues of the sticker is determined to be plural, different types of stickers may be issued. In this way, it is possible to prevent the stickers from being attached to other vehicles that have not been upgraded, and to add value by improving the appearance of a sticker attached to a place that can be seen and checked from the outside.

Hereinafter, embodiments of the present disclosure will be described based on the accompanying drawings. The configurations of the following embodiments are examples, and the present disclosure is not limited to the configurations of the embodiments. In addition, the following embodiments can be combined with one another as long as such combinations are possible and appropriate.

First Embodiment

FIG. 1 is a view illustrating a schematic configuration of a system 1 according to an embodiment. In the example of FIG. 1, the system 1 includes an in-vehicle device 100 mounted on a vehicle 10, a user terminal 20 carried by a user of the vehicle 10, a center server 30, and an update server 40.

The in-vehicle device 100 includes a computer mounted on the vehicle 10. The in-vehicle device 100 performs control of the vehicle 10 and the like by executing installed software.

The user terminal 20 is an information processing apparatus used by a user associated with the vehicle 10. Here, note that the user associated with the vehicle 10 may be the owner of the vehicle 10. As an alternative, the user terminal 20 may be a terminal that is used at a place associated with the vehicle 10, such as a dealer, a repair and maintenance factory or the like (hereinafter, also simply referred to as a factory), and the user may be a worker of the factory or the like.

The center server 30 is a server device that manages a database storing the number of issues of each sticker according to upgrades when the upgrades of vehicle parts are implemented. Information about the number of issues of a sticker (number of issues information) includes information about the vehicle part, information about the number of issues of the sticker, and the like. Upon receiving a request for the issuance of a sticker from the in-vehicle device 100, the user terminal 20 or the update server 40, the center server 30 determines the number of issues of the sticker, and outputs information so that the number of pieces of the sticker will be issued. At this time, information may be output so that the sticker is delivered to a predetermined delivery destination.

The update server 40 is a server device that manages the upgrade of the software for the in-vehicle device 100, and is also a server device that remotely executes the upgrade of the software for the in-vehicle device 100. The update server 40 stores software to be installed on the in-vehicle device 100, and remotely installs the software on the in-vehicle device 100 thereby to upgrade the in-vehicle device 100 or to upgrade the software thereof. The update server 40 obtains, from another computer, the software to be installed on the in-vehicle device 100.

The user of the vehicle 10 whose vehicle parts have been upgraded can request the center server 30 to issue a sticker via the user terminal 20. In addition, in cases where the software on the in-vehicle device 100 is updated, the update server 40 can request the center server 30 to issue a sticker. Note that in cases where the software on the in-vehicle device 100 is updated, the user terminal 20 or the in-vehicle device 100 can also request the center server 30 to issue a sticker.

Here, the sticker in the present disclosure will be described. The sticker in the present disclosure is a label that is attached to the vehicle 10 in order to certify that at least one of plurality of vehicle parts included in the vehicle 10 has been upgraded. As the plurality of vehicle parts included in the vehicle 10, there can be exemplified, for example, an electronic control unit (ECU), an in-vehicle computer, communication devices, infotainment terminals, air conditioning devices, seats, a steering wheel, doors, a sunroof, mirrors, other electric components, and the like. The in-vehicle device 100 can include these devices or components. Note that in the description of the embodiment, the target of upgrade is a vehicle part, but the target of upgrade may be a component composed of a plurality of vehicle parts. In this case, the component can be upgraded by replacing several vehicle parts that make up the component. In addition, a part of the vehicle body may be referred to as a vehicle part.

Figure 2:
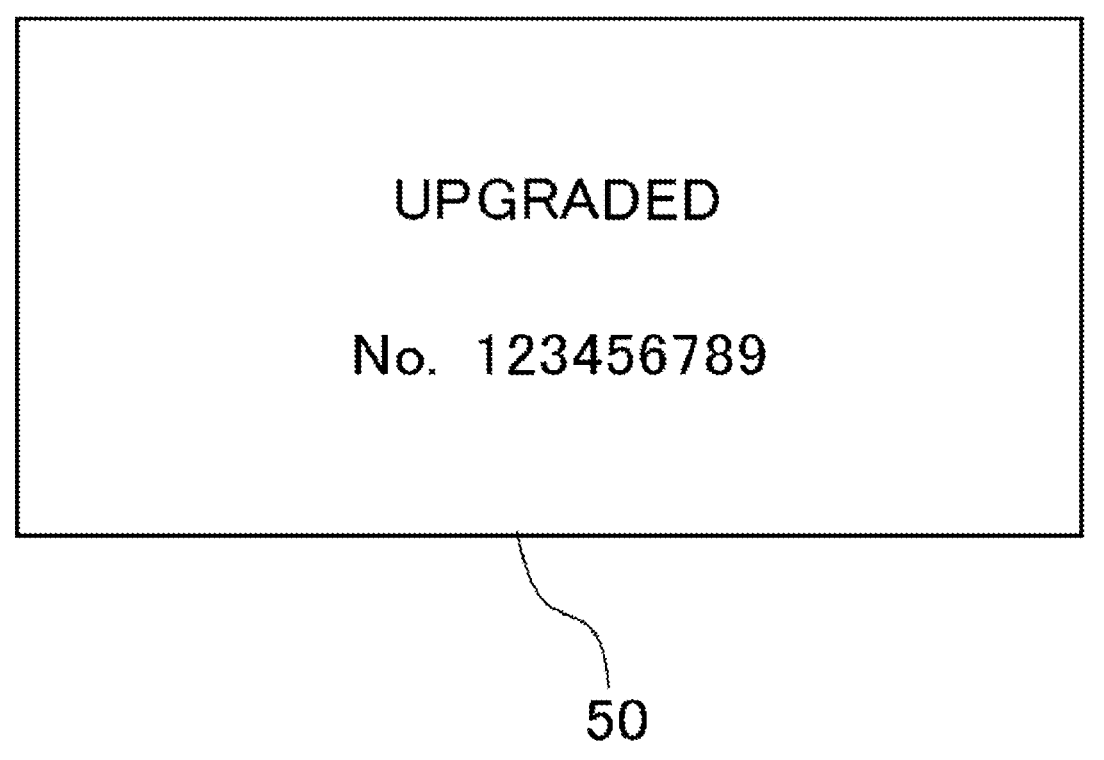

FIG. 2 is a view illustrating an example of a sticker 50. The sticker 50 describes a statement or the like to the effect that an upgrade has been performed for any vehicle part, or to the effect that any vehicle part has been replaced with an upgraded product. The wording described on the sticker 50 is not limited to a specific one, as long as it can be determined that some update has been performed on the vehicle 10. The sticker 50 may include a two-dimensional code or an electronic tag for identifying the upgraded vehicle part, the content of the upgrade, or the like.

Figure 3:
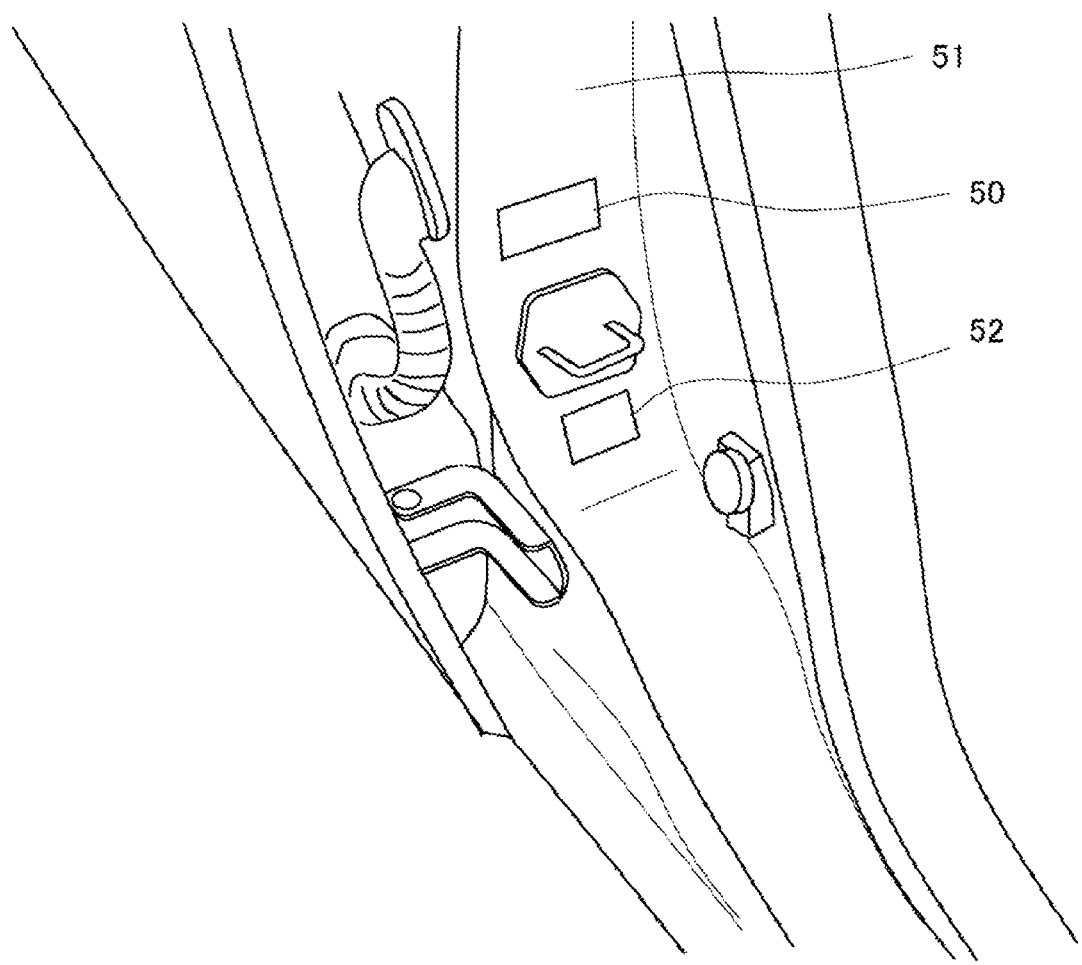
FIG. 3 is a view illustrating a position or location at which the sticker is attached.

The sticker 50 is attached to a predetermined position of the vehicle 10 according to the content of the upgrade. FIG. 3 is a view illustrating a position at which the sticker 50 is attached. FIG. 3 is a view of the body frame of the vehicle 10 as seen from the right front side. The lower part of the figure is a side sill, and the center thereof is a center pillar 51 (also referred to as a B pillar). In this example, it is assumed that a sticker 50 is attached to a predetermined region of the center pillar 51. The place of the attachment may be in the vicinity of a caution plate 52 on which a chassis number or the like is described. By arranging the sticker 50 in such a place, it becomes possible to easily check the presence or absence of an upgrade by opening a door.

Figure 4:
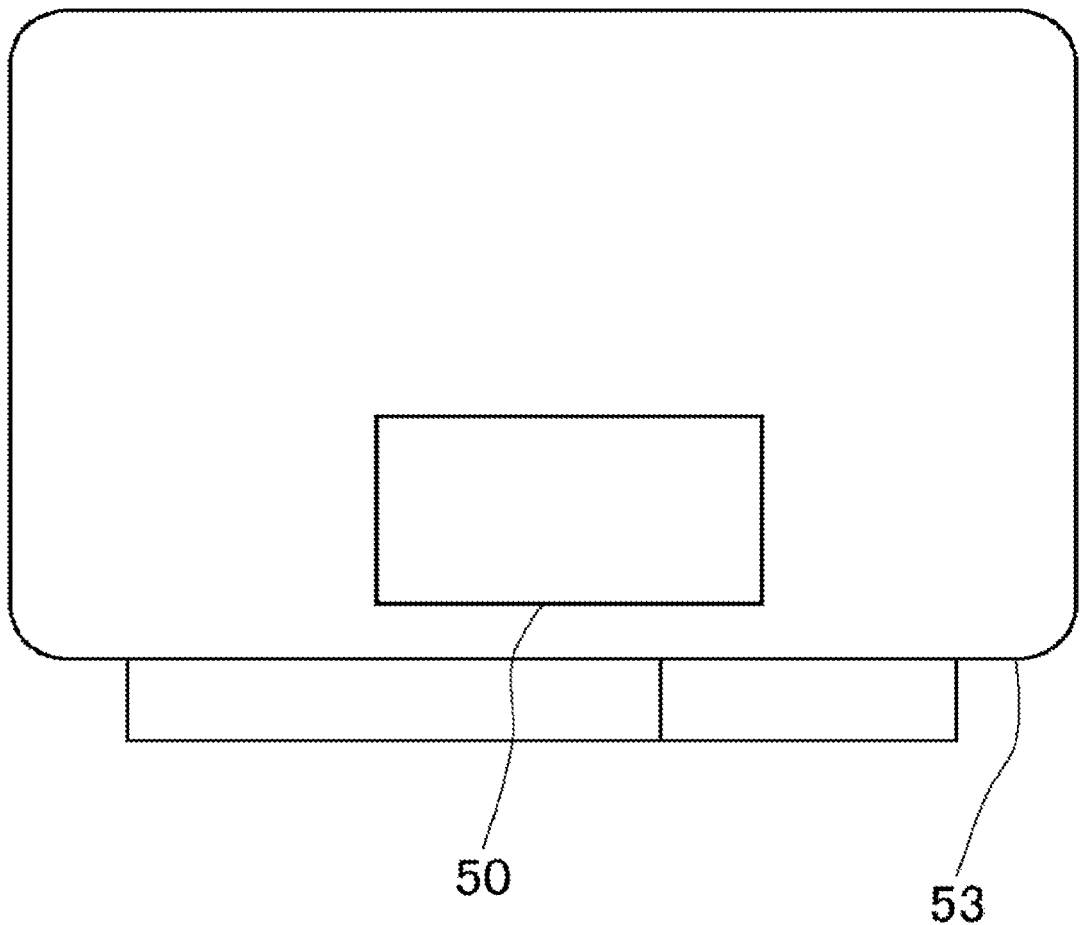
FIG. 4 is a view illustrating an example in which the sticker is attached to an electronic control unit (ECU) provided in a vehicle.

On the other hand, FIG. 4 is a view illustrating an example in which a sticker 50 is attached to an electronic control unit 53 (ECU 53) provided in a vehicle. Even if the software on the ECU 53 has been updated, it cannot be easily determined from the outside, and hence, a sticker 50 is attached to the housing of the ECU 53. In this way, in cases where the sticker 50 is attached to the vehicle part itself, information such as "The target vehicle part is an upgraded product." is displayed on the sticker 50. In addition, a sticker 50 may be attached near a vehicle part. In such a case, too, a similar sticker 50 is attached. Here, the ECU 53 may be arranged in a place where it cannot be easily seen from the outside. For example, the ECU 53 may be covered with another part, an interior, or the like. In such a case, it is difficult to check the sticker 50 attached to the ECU 53 from the outside. Therefore, in cases where the sticker 50 is attached to a place that is difficult to check from the outside, another sticker 50 is also attached to the center pillar 51, which is a place that can be easily checked from the outside. Accordingly, in cases where stickers 50 are issued, a sticker 50 will be attached to the center pillar 51 without fail. As a result, by looking at the sticker 50 attached to the center pillar 51, it is possible for the user of the vehicle 10 to grasp the status of the upgrade of vehicle parts of the entire vehicle 10. Here, note that the place where the sticker 50 is attached is not limited to the center pillar, but may be, for example, an engine room.

The center server 30 determines the number of issues of the sticker 50 according to a vehicle part updated. In cases where a sticker 50 is attached only to the center pillar 51 illustrated in FIG. 3, the number of issues thereof is set to one, for example, whereas in cases where a sticker 50 is attached at or near the vehicle part illustrated in FIG. 4, the number of issues thereof is set to two, for example. Here, note that the sticker(s) 50 may be attached by the user of the vehicle 10 or may be attached by a worker in a factory.

The in-vehicle device 100, the user terminal 20, the center server 30, and the update server 40 are connected to one another by means of a network N1. Note that the network N1 is, for example, a worldwide public communication network such as the Internet or the like, and a WAN (Wide Area Network) or other communication networks may be adopted. Also, the network N1 may include a telephone communication network such as a mobile phone network or the like, and/or a wireless communication network such as Wi-Fi (registered trademark) or the like. Although FIG. 1 illustrates one vehicle 10 and one user terminal 20 by way of example, there can be a plurality of vehicles 10 and a plurality of user terminals 20.

Figure 5:
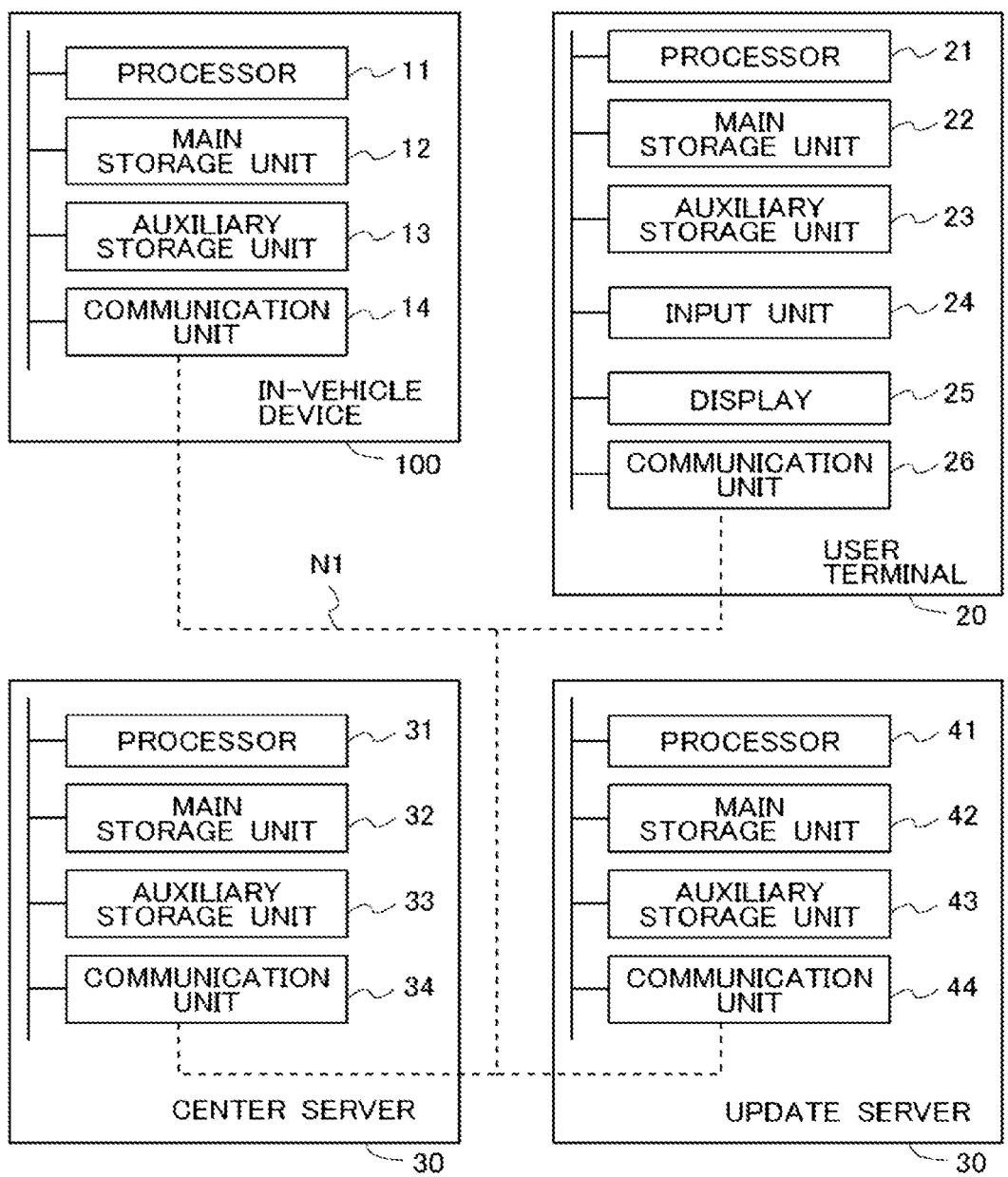
FIG. 5 is a block diagram schematically illustrating an example of a configuration of each of an in-vehicle device, a user terminal, a center server, and an update server, which together constitute the system according to the embodiment.

Hardware configurations and functional configurations of the in-vehicle device 100, the user terminal 20, the center server 30 and the update server 40 will be described based on FIG. 5. FIG. 5 is a block diagram schematically illustrating an example of a configuration of each of the in-vehicle device 100, the user terminal 20, the center server 30 and the update server 40, which together constitute the system 1 according to the embodiment.

The center server 30 has a configuration of a general computer. The center server 30 includes a processor 31, a main storage unit 32, an auxiliary storage unit 33, and a communication unit 34. These components are connected to one another by means of a bus. The processor 31 is an example of a controller. Also, the main storage unit 32 and the auxiliary storage unit 33 are examples of a memory.

The processor 31 is a CPU (Central Processing Unit), a DSP (Digital Signal Processor), or the like. The processor 31 controls the center server 30 thereby to perform various information processing operations. The main storage unit 32 is a RAM (Random Access Memory), a ROM (Read Only Memory), or the like. The auxiliary storage unit 33 is an EPROM (Erasable Programmable ROM), a hard disk drive (HDD), a removable medium, or the like. The auxiliary storage unit 33 stores an operating system (OS), various programs, various tables, and the like. The processor 31 loads a program stored in the auxiliary storage unit 33 into a work area of the main storage unit 32 and executes the program, so that each component or the like is controlled through the execution of the program. Thus, the center server 30 realizes functions matching predetermined purposes, respectively. The main storage unit 32 and the auxiliary storage unit 33 are computer readable recording media. Note that the center server 30 may be a single computer or a plurality of computers that cooperate with one another. In addition, the information stored in the auxiliary storage unit 33 may be stored in the main storage unit 32. Also, the information stored in the main storage unit 32 may be stored in the auxiliary storage unit 33.

The communication unit 34 is a means or unit that communicates with the in-vehicle device 100 (which may be the vehicle 10), the user terminal 20, and the update server 40 via the network N1. The communication unit 34 is a circuit for communicating with other devices via the network N1 by making use of a LAN (Local Area Network) interface board, a mobile communication service (e.g., a telephone communication network such as 5G (5th Generation), 4G (4th Generation), 3G (3rd Generation), LTE (Long Term Evolution) or the like), and/or a wireless communication network such as Wi-Fi (registered trademark), Bluetooth (registered trademark) Low Energy, NFC (Near Field Communication), UWB (Ultra Wideband) or the like. The LAN interface board or the wireless communication circuit is connected to the network N1.

Now, the update server 40 has a configuration of a computer. When obtaining update data for the software on the in-vehicle device 100 from another terminal or the like, the update server 40 remotely installs the update data on the corresponding in-vehicle device 100 via wireless communication. Well-known techniques can be used for installing software via wireless communication. The update server 40 includes a processor 41, a main storage unit 42, an auxiliary storage unit 43, and a communication unit 44. These components are connected to one another by means of a bus. The processor 41, the main storage unit 42, the auxiliary storage unit 43, and the communication unit 44 are the same as the processor 31, the main storage unit 32, the auxiliary storage unit 33, and the communication unit 34 of the center server 30, respectively, and hence, the description thereof will be omitted.

Then, the in-vehicle device 100 has a configuration of a computer. The in-vehicle device 100 includes a processor 11, a main storage unit 12, an auxiliary storage unit 13, and a communication unit 14. These components are connected to one another by means of a bus. The processor 11, the main storage unit 12, the auxiliary storage unit 13, and the communication unit 14 are the same as the processor 31, the main storage unit 32, the auxiliary storage unit 33, and the communication unit 34 of the center server 30, respectively, and hence, the description thereof will be omitted.

Now, the user terminal 20 will be described. The user terminal 20 is, for example, a smart phone, a mobile phone, a tablet terminal, a personal information terminal, a wearable computer (such as a smart watch or the like), or a small computer such as a personal computer (PC). The user terminal 20 includes a processor 21, a main storage unit 22, an auxiliary storage unit 23, an input unit 24, a display 25, and a communication unit 26. These components are connected to one another by means of a bus. The processor 21, the main storage unit 22, the auxiliary storage unit 23, and the communication unit 26 are the same as the processor 31, the main storage unit 32, the auxiliary storage unit 33, and the communication unit 36 of the center server 30, respectively, and hence, the description thereof will be omitted.

The input unit 24 is a means or unit that receives an input operation performed by the user, and is, for example, a touch panel, a mouse, a keyboard, a push button, or the like. The display 25 is a means or unit for presenting information to the user, and is, for example, an LCD (Liquid Crystal Display), an EL (Electroluminescence) panel, or the like. The input unit 24 and the display 25 may be configured as a single touch panel display.

Figure 6:
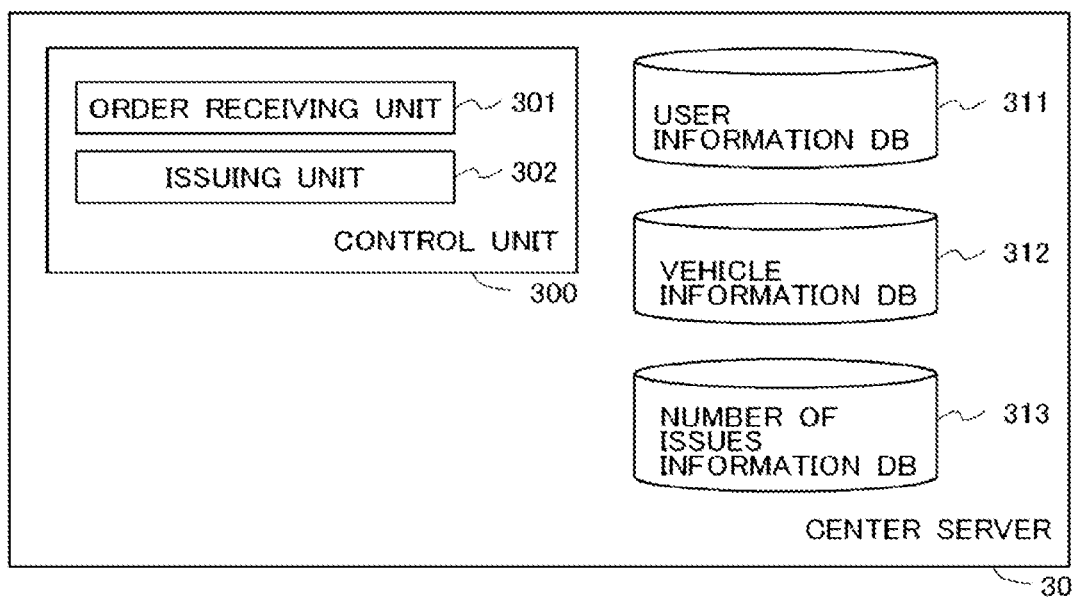
FIG. 6 is a diagram illustrating by way of example a functional configuration of the center server.

Then, the functions of the center server 30 will be described. FIG. 6 is a view illustrating by way of example a functional configuration of the center server 30. The center server 30 includes, as its functional components, a control unit 300, a user information DB 311, a vehicle information DB 312, and a number of issues information DB 313. The processor 31 of the center server 30 executes the processing of the control unit 300 by a computer program on the main storage unit 32. However, any of the individual functional components or a part of the processing thereof may be implemented by a hardware circuit. The control unit 300 includes an order receiving unit 301 and an issuing unit 302.

The user information DB 311, the vehicle information DB 312, and the number of issues information DB 313 are built by a program of a database management system (DBMS) that is executed by the processor 31 to manage data stored in the auxiliary storage unit 33. The user information DB 311, the vehicle information DB 312, and the number of issues information DB 313 are, for example, relational data bases.

Here, note that any of the individual functional components of the center server 30 or a part of the processing thereof may be implemented by another or other computers connected to the network N1.

The order receiving unit 301 obtains data about an order for a sticker by interacting with the user terminal 20, the update server 40, or the in-vehicle device 100. The order receiving unit 301 may generate a user interface screen for interacting with the user terminal 20. The user interface screen may be generated by using a built-in web server or the like. In the present embodiment, the order receiving unit 301 generates and provides a list of products including vehicle parts compatible with the vehicle 10, for example, based on an identifier of the vehicle 10 received from the user terminal 20. Then, the order receiving unit 301 receives the order for the sticker 50 designated by the user terminal 20. Note that when a vehicle part for upgrade is ordered, the order receiving unit 301 may accept an order for a sticker 50 on the assumption that the sticker 50 is also ordered.

The issuing unit 302 determines the number of issues of the sticker 50 in response to the fact that the sticker 50 has been ordered. The relationship between the vehicle part and the number of issues of the sticker 50 has been stored in the number of issues information DB 313. The issuing unit 302 obtains from the number of issues information DB 313 the number of issues of the sticker 50 corresponding to the vehicle part whose order has been received by the order receiving unit 301, and generates data (ordering data) for ordering the sticker 50. This ordering data is transmitted to a base (a factory or the like) that manufactures or sells the sticker 50. Here, note that the ordering data may include information about the delivery destination of the sticker. The information about the delivery destination of the sticker has been stored in the user information DB 311.

The user information DB 311 is formed by storing user information in the auxiliary storage unit 33. The user information is information about the user of the vehicle 10, and includes information about the user ID, the name of the user, the telephone number of the user, the location of the user, and the like. The location of the user can be used as the delivery destination of the sticker 50.

Next, the configuration or structure of the vehicle information stored in the vehicle information DB 312 will be described based on FIG. 7. FIG. 7 is a view illustrating an example of a table configuration of the vehicle information DB 312. The vehicle information table has fields for vehicle ID, user ID, factory ID, chassis number, and upgrade history, respectively. In the vehicle ID field, information that can identify each vehicle (vehicle ID) is entered. A vehicle ID has been assigned to each vehicle 10 in advance. In the user ID field, information (user ID) that can identify the user associated with each vehicle 10, such as the user of each vehicle 10, is entered.

In the factory ID field, information that can identify the factory that inspects or maintains each vehicle 10, e.g., information about the dealer who sold each vehicle 10 or the repair and maintenance factory designated by each user, is entered. In the chassis number field, information about the chassis number of each vehicle 10 is entered. Note that the chassis number is a number unique to each vehicle, and hence, the chassis number may be used as the vehicle ID. In the upgrade history field, information related to the history of upgrade of each vehicle part is entered. For example, the part number of the part attached by the upgrade, the name of the upgraded software, the version of the upgraded software, or the like is entered.

Then, the configuration of the number of issues information stored in the number of issues information DB 313 will be described based on FIG. 8. FIG. 8 is a view illustrating an example of a table configuration of the number of issues information DB 313. A number of issues information table has fields for part number, and number of issues of sticker (i.e., sticker number of issues), respectively. In the part number field, the number of each vehicle part (part number) is entered. The part number of each part differs between the part before the upgrade and the part after the upgrade. Here, note that the part number of a vehicle part for which a sticker will not be issued even if the vehicle part is upgraded is not entered in the number of issues information DB 313.

In the sticker number of issues field, information about the number of issues of each sticker 50 at the time of an upgrade is entered. In cases where one piece of sticker 50 is to be issued, "1" is entered into the sticker number of issues field. "1" is entered into the sticker number of issues field in the case where the sticker 50 is attached to a place visible from the outside, i.e., in the case where the sticker 50 is attached only to the center pillar 51 of the vehicle 10. Note that the position at which the sticker 50 is attached is not limited to the center pillar 51.

On the other hand, in cases where the sticker 50 is attached to a place not visible from the outside, "2" is entered into the sticker number of issues field. "2" is entered into the sticker number of issues field, for example, in the case where the sticker 50 to be attached to a place other than the center pillar 51 of the vehicle 10 is included, or in the case where the sticker 50 to be attached to the vehicle part or its surroundings is included.

Figure 9:
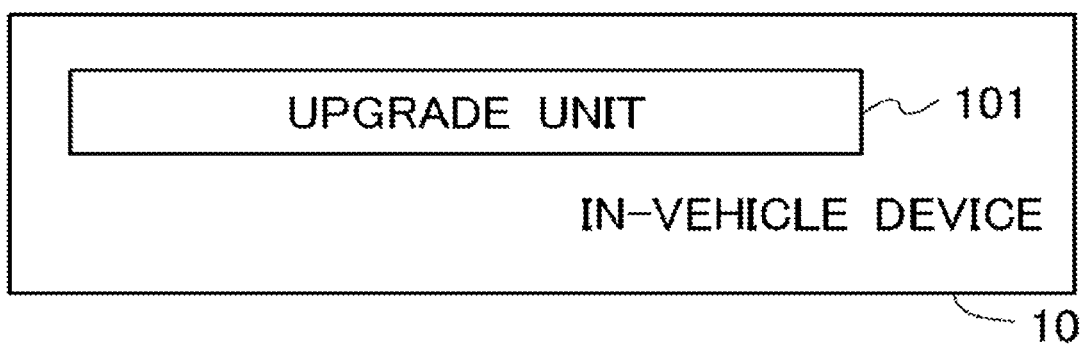
FIG. 9 is a diagram illustrating a functional configuration of the in-vehicle device.

Next, the functions of the in-vehicle device 100 will be described. FIG. 9 is a view illustrating a functional configuration of the in-vehicle device 100. The in-vehicle device 100 has an upgrade unit 101 as its functional component. The processor 11 of the in-vehicle device 100 executes the processing of the upgrade unit 101 by a computer program on the main storage unit 12. However, any of the individual functional components or a part of the processing thereof may be implemented by a hardware circuit.

The upgrade unit 101 receives the update data for the software on the in-vehicle device 100 from the update server 40, and executes the upgrade of the software. The update data is transmitted from the update server 40. When the upgrade is completed, the upgrade unit 101 notifies the update server 40 to that effect. Note that in cases where the user makes a predetermined input to the in-vehicle device 100, the in-vehicle device 100 may request the update server 40 to transmit the upgrade data. In addition, in cases where a predetermined request is made from the user terminal 20 to the update server 40, the update server 40 may transmit the update data to the in-vehicle device 100.

Figure 10:
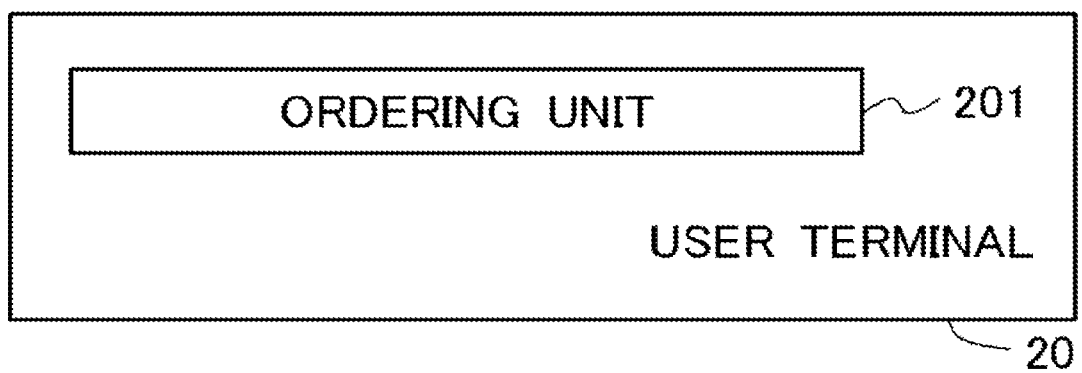
FIG. 10 is a diagram illustrating a functional configuration of the user terminal.

Now, the functions of the user terminal 20 will be described. FIG. 10 is a diagram illustrating a functional configuration of the user terminal 20. The user terminal 20 has an ordering unit 201 as its functional component. The processor 21 of the user terminal 20 executes the processing of the ordering unit 201 by a computer program on the main storage unit 22.

The ordering unit 201 generates data for ordering a vehicle part or a sticker according to the input to the input unit 24 of the user terminal 20. This data includes, for example, the vehicle ID, the user ID, and the part number of the vehicle part. For example, when the user accesses a website for ordering parts via the user terminal 20 and enters the vehicle ID, the user ID, and the vehicle part, data for ordering is generated and transmitted to the center server 30. Note that the sticker 50 may be ordered at the same time when the vehicle part is ordered, or only the sticker 50 may be ordered separately.

Figure 11:
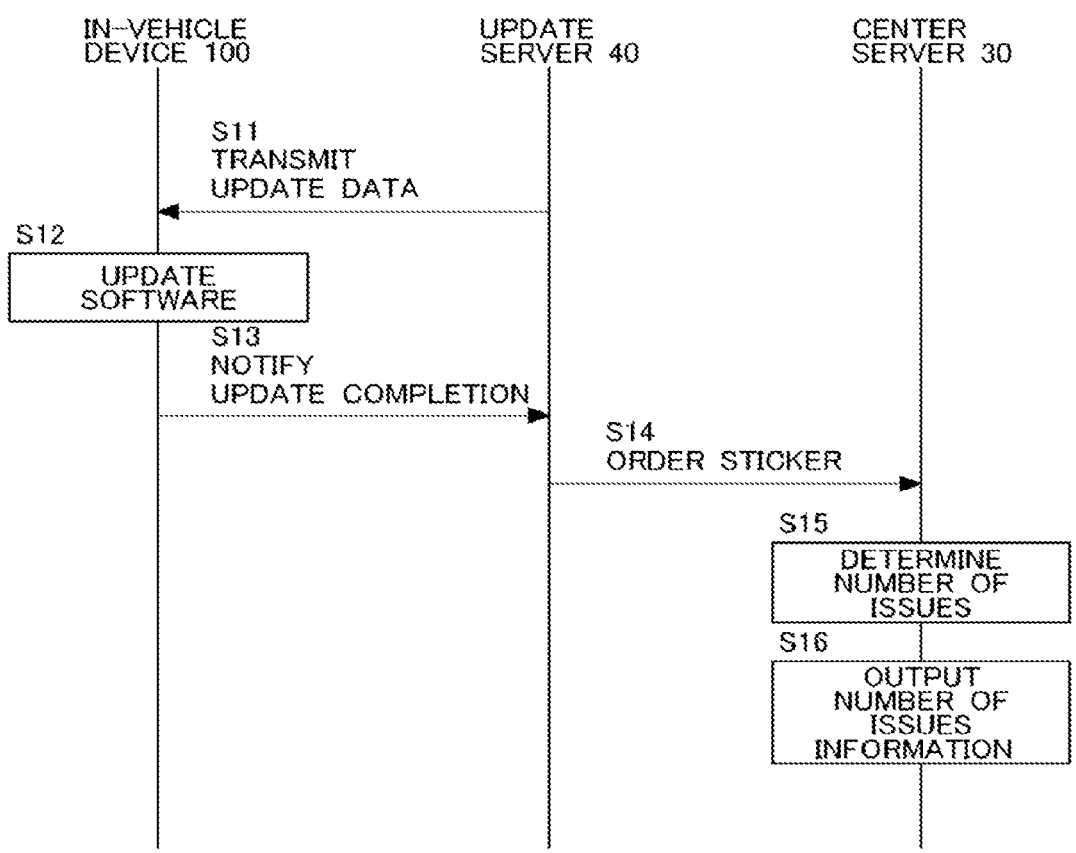
FIG. 11 is a sequence diagram of processing of the system as a whole according to the embodiment.

Next, the processing of the system as a whole at the time of determining the number of issues of the sticker 50 will be described. FIG. 11 is a sequence diagram of the processing of the entire system 1 according to the embodiment. Here, note that the following explanation will be made on the assumption that necessary information has been stored in each database. FIG. 11 illustrates processing in the case where the in-vehicle device 100 performs a software update in accordance with a command or instruction from the update server 40.

Upon obtaining the data for updating the software on the in-vehicle device 100, the update server 40 identifies the in-vehicle device 100 to be targeted and transmits the update data to it (S11). Note that the update data is uploaded to the update server 40 by a manager of the update server 40. The in-vehicle device 100, which has received the update data, executes the software update (S12). Then, when the update is completed, an update completion notification is transmitted from the in-vehicle device 100 to the update server 40 (S13). This notification includes, for example, information about the vehicle ID and the updated software.

The update server 40, which has received the update completion notification, orders the sticker 50 from the center server 30 (S14). At this time, the vehicle ID and the part number corresponding to the updated software are transmitted to the center server 30. The center server 30 receives an order for the sticker 50, and determines the number of issues of the sticker 50 (S15). Here, the sticker 50 corresponding to the update of the software on the in-vehicle device 100 is attached to the in-vehicle device 100. Therefore, the number of issues of the sticker 50 is two. That is, a sticker 50 to be attached to the center pillar 51 is also issued.

In the number of issues information DB 313, "2" is entered in the sticker number of issues field of the record for the part number corresponding to the update data, so the center server 30 determines the number of issues of the sticker 50 to be two.

Then, the center server 30 outputs information about the number of issues of the sticker 50 (S16). The information about the number of issues of the sticker 50 referred to herein is information indicating that the number of pieces of the sticker to be issued is two, and is also information about the number of pieces of the sticker 50 to be shipped from a factory that manufactures the sticker 50. Here, note that, at the same time, information indicating the address, the name of an individual or entity, or the like of the delivery destination of the sticker 50, which is printed as a delivery label at the time of delivering the sticker 50, may also be output. For example, in a factory that manufactures the sticker 50, the sticker 50 is shipped by attaching this delivery label to the wrapping paper of the sticker 50.

Here, note that in the example illustrated in FIG. 11, the sticker 50 is ordered from the update server 40 to the center server 30, but instead of this, the sticker 50 may be ordered from the in-vehicle device 100 or the user terminal 20 to the center server 30. In addition, the update server 40 may place an order for the sticker 50 to the center server 30 immediately after transmitting the update data.

Figure 12:
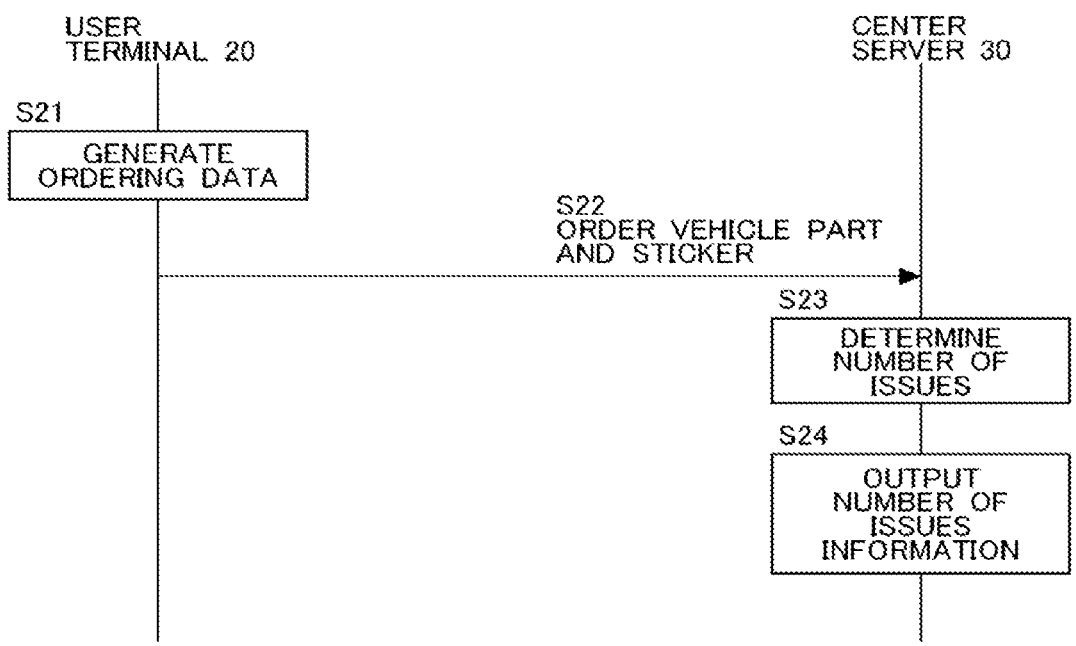
FIG. 12 is a sequence diagram of processing of the system as a whole in the case where the sticker is attached only to a center pillar of the vehicle.

Next, the processing of the system 1 as a whole in the case where the sticker 50 is attached only to the center pillar 51 of the vehicle 10 will be described. FIG. 12 is a sequence diagram of the processing of the entire system 1 in the case where the sticker 50 is attached only to the center pillar 51 of the vehicle 10. Here, note that the following explanation will be made on the assumption that necessary information has been stored in each database. FIG. 12 illustrates the processing in the case of ordering a vehicle part from the user terminal 20.

When a user makes a predetermined input to the user terminal 20 for ordering a vehicle part, ordering data is generated at the user terminal 20 (S21). This ordering data includes information such as a part number, a vehicle ID, a user ID, and the like. For example, when the user terminal 20 accesses a website on the Internet, a screen for entering a part number, a vehicle ID, and a user ID is displayed on the display 25. Then, when the user enters the part number, the vehicle ID, and the user ID via the input unit 24, information about the order for the vehicle part is transmitted to the center server 30 (S22). Note that only the sticker 50 can be ordered from the user terminal 20.

The center server 30, which has received the order for the vehicle part, determines the number of issues of the sticker 50 (S23). This sticker 50 is defined as a sticker 50 that is to be attached to only the center pillar 51. That is, in the number of issues information DB 313, "1" is entered in the sticker number of issues field of the record for the part number corresponding to the vehicle part, so the center server 30 determines the number of issues of the sticker 50 to be one.

Then, the center server 30 outputs information about the number of issues of the sticker 50 (S24). The information about the number of issues of the sticker 50 referred to herein is information indicating that the number of pieces of the sticker to be issued is one, and is also information about the number of pieces of the sticker 50 to be shipped from a factory that manufactures the sticker 50. Here, note that, at the same time, information indicating the address, the name of an individual or entity, or the like of the delivery destination of the sticker 50, which is printed as a delivery label at the time of delivering the sticker 50, may also be output. For example, in a factory that manufactures the sticker 50, the sticker 50 is shipped by attaching this delivery label to the wrapping paper of the sticker 50. Note that the vehicle part and the sticker 50 may be delivered separately or together.

Figure 13:
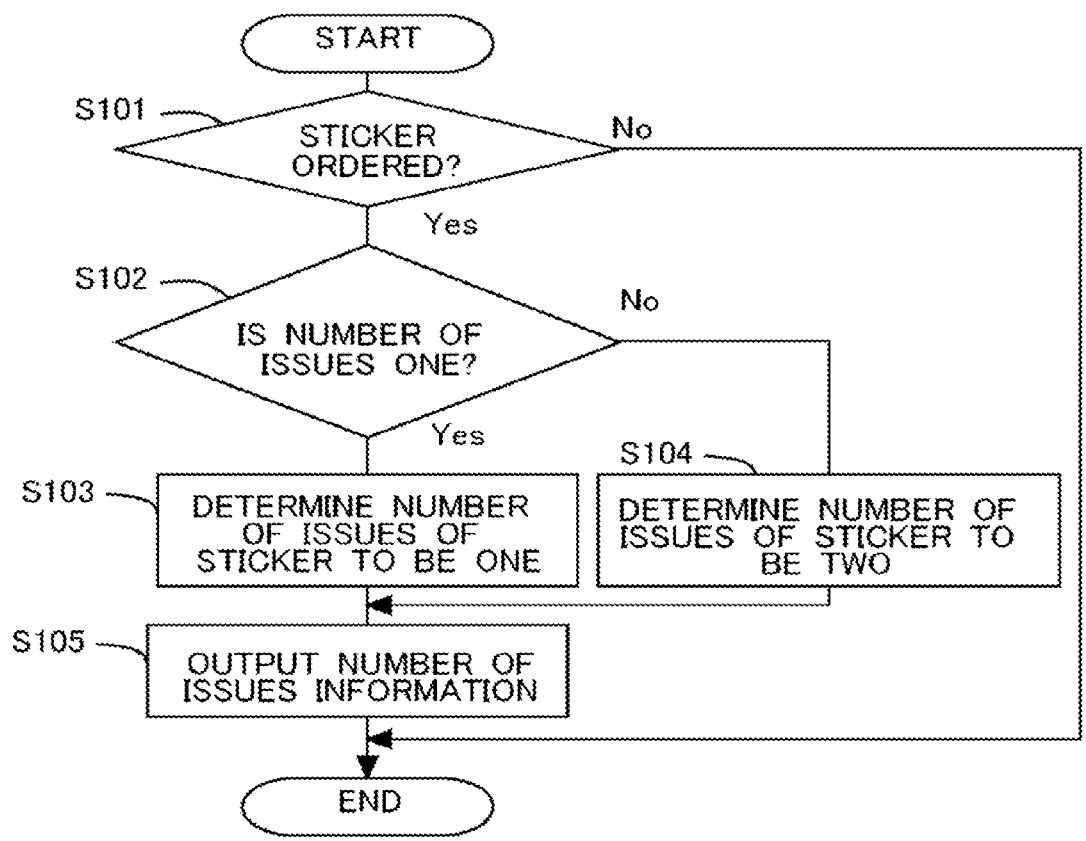
FIG. 13 is a flowchart of processing of determining the number of issues of the sticker at the center server according to the embodiment.

Then, the processing of determining the number of issues of the sticker 50 in the center server 30 will be described. FIG. 13 is a flowchart of the processing of determining the number of issues of the sticker 50 at the center server 30 according to the embodiment. The processing illustrated in FIG. 13 is executed at predetermined time intervals in the center server 30. Here, note that the following explanation will be made on the assumption that necessary information has been stored in each database.

In step S101, the order receiving unit 301 determines whether or not a sticker 50 has been ordered from the in-vehicle device 100, the user terminal 20, or the update server 40. Note that, as an alternative, in step S101, the order receiving unit 301 may determine whether or not an upgrade has been made for which a sticker 50 is issued, or whether or not a vehicle part has been ordered for which a sticker 50 is issued. When an affirmative determination is made in step S101, the processing or routine proceeds to step S102, whereas when a negative determination is made, this routine is ended.

In step S102, the issuing unit 302 determines whether or not the number of issues of the sticker 50 is one. The issuing unit 302 extracts, from the sticker number of issues field of the number of issues information DB 313, the number of issues of the sticker 50 corresponding to the part number included in the information received at the time of ordering the sticker 50. Then, the issuing unit 302 determines whether or not the number of issues of the sticker 50 thus extracted is "1". When an affirmative determination is made in step S102, the processing proceeds to step S103, whereas when a negative determination is made, the processing proceeds to step S104.

In step S103, the issuing unit 302 determines that the number of issues of the sticker 50 is one. On the other hand, in step S104, the issuing unit 302 determines that the number of issues of the sticker 50 is two. Then, in step S105, the issuing unit 302 outputs the number of issues of the sticker 50 determined in step S103 or step S104. At this time, for example, data for ordering the sticker 50 may be transmitted to a computer at a factory where the sticker 50 is manufactured. In addition, at the same time, data for printing an address or the like corresponding to the delivery destination on a delivery label may be transmitted to a computer at a factory where the sticker 50 is shipped. The delivery destination of the sticker 50 has been stored in the user information DB 311 in association with the user ID.

As described above, according to the embodiment, the number of issues of the sticker 50 is determined in accordance with the position at which the sticker 50 is to be attached, so that the sticker 50 can be attached at a position that can be checked from the outside.

Modification

In the above description, in cases where a plurality of pieces of the sticker 50 are issued, the same type of sticker 50 is issued, but the present invention is not limited to this, and different types of stickers 50 may be issued. For example, in cases where two pieces of stickers 50 are issued, one piece of good-looking sticker 50 may be issued. This good-looking sticker is, for example, a sticker 50 that is to be attached to a position visible from the outside. For example, it is possible to add value by attaching the good-looking sticker 50 to the center pillar 51. On the other hand, a sticker 50 to be attached to a position that is not visible from the outside may be used as long as the content of the upgrade can be checked, and hence, it is not necessary to attach a good-looking sticker 50 at such a position. Therefore, costs can be reduced by attaching a low-cost sticker 50. Note, that in the case of issuing one piece of sticker 50, a good-looking sticker 50 may be issued.

For example, a glossy sticker 50 and a non-glossy sticker 50 may be issued as different types of stickers 50. Also, as an alternative, a colored sticker 50 and an uncolored sticker 50 may be issued as different stickers 50. In addition, as another alternative, a sticker 50 colored in a plurality of colors and a sticker 50 colored in a single color may be issued as different stickers 50. Moreover, as a further alternative, a sticker 50 made of metal and a sticker 50 made of paper or resin may be issued as different stickers 50. The types of stickers 50 to be issued are stored in the number of issues information DB 313 together with the number of issues for each type of the stickers.

In step S105 of FIG. 13 above, in cases where the number of issues of the sticker 50 is two, the issuing unit 302 outputs information that different stickers are to be issued. At this time, for example, data for ordering different types of stickers 50 may be transmitted to a computer at a factory where the stickers 50 are manufactured.

In this way, by issuing the different types of stickers 50, it is possible to reduce costs while providing added value. In addition, when a plurality of stickers 50 are issued, it is possible to prevent them from being diverted to other vehicles.

OTHER EMBODIMENTS

The above-described embodiment and modification are merely examples, but the present disclosure can be implemented with appropriate modifications without departing from the spirit thereof.

The processing and/or means (devices, units, parts, etc.) described in the present disclosure can be freely combined and implemented as long as no technical contradiction occurs.

In addition, the processing described as being performed by a single device or unit may be shared and performed by a plurality of devices or units. Alternatively, the processing described as being performed by different devices or units may be performed by one device or unit. In a computer system, a hardware configuration (server configuration) for realizing each function thereof can be changed in a flexible manner. For example, the center server 30 may include a part or all of the functions of the update server 40. Also, for example, the update server 40 may include a part or all of the functions of the center server 30.

The present disclosure can also be realized by supplying to a computer a computer program in which the functions described in the above-described embodiment or modification are implemented, and reading out and executing the program by means of one or more processors included in the computer. Such a computer program may be provided to the computer by a non-transitory computer readable storage medium that can be connected to a system bus of the computer, or may be provided to the computer via a network. The non-transitory computer readable storage medium includes, for example, any type of disk such as a magnetic disk (e.g., a floppy (registered trademark) disk, a hard disk drive (HDD), etc.), an optical disk (e.g., a CD-ROM, a DVD disk, a Blu-ray disk, etc.) or the like, a read-only memory (ROM), a random-access memory (RAM), an EPROM, an EEPROM, a magnetic card, a flash memory, an optical card, or any type of medium suitable for storing electronic commands or instructions.

What is claimed is:

1. An information processing apparatus comprising:
a communication circuit;
a memory storing a relationship between part numbers of a plurality of parts of a vehicle, a number of issues of a sticker indicating that the plurality of parts have been upgraded, and a type of the sticker or a combination of types of the stickers corresponding to the number of issues of the sticker to be issued; and
a controller configured to:
receive information about an order for the sticker for a predetermined part of the plurality of parts via the communication circuit, the information transmitted from an external device and including the part number of the predetermined part,
extract, from the memory, the number of issues of the sticker and the type of the sticker or the combination of types of the stickers corresponding the part number of the predetermined part included in the information about the order for the sticker,
determine whether or not the number of issues of the sticker for the predetermined part is one based on the number of issues of the sticker extracted from the memory,
when the number of issues of the sticker for the predetermined part is one, transmit information about issues of the sticker to a manufacturing factory of the sticker via the communication circuit, the information about issues of the sticker including information indicating that the number of pieces of the sticker to be issued is one based on the number of issues of the sticker extracted from the memory and information indicating that a first type of the sticker is issued based on the type of the sticker or the combination of types of the stickers extracted from the memory, and
when the number of issues of the sticker for the predetermined part is not one, transmit information about issues of the sticker to the manufacturing factory via the communication circuit, the information about issues of the sticker including information indicating that the number of pieces of the sticker to be issued is two based on the number of issues of the sticker extracted from the memory and information indicating that the first type of the sticker and a second type of the sticker are issued based on the type of the sticker or the combination of types of the stickers extracted from the memory, the second type being different from the first type, wherein the first type of the sticker is different in type from the second type of the sticker in any one of the followings respects: glossy or non-glossy on the sticker, colored or uncolored on the sticker, colored in multiple colors or single color on the sticker, and material of the sticker.

2. The information processing apparatus according to claim 1, wherein
the predetermined part includes an electronic control device on which software to be upgraded by remote operation is executed.

3. An information processing method for causing a computer comprising a communication circuit, and a memory storing a relationship between part numbers of a plurality of parts of a vehicle, number of issues of sticker indicating that the plurality of parts have been upgraded, and a type of the sticker or a combination of types of the stickers corresponding to the number of issues of the sticker to be issued to;
receive information about an order for the sticker for a predetermined part of the plurality of parts via the communication circuit, the information transmitted from an external device and including the part number of the predetermined part;

extract, from the memory, the number of issues of the sticker and the type of the sticker or the combination of types of the stickers corresponding the part number of the predetermined part included in the information about the order for the sticker;

determine whether or not the number of issues of the sticker for the predetermined part is one based on the number of issues of the sticker extracted from the memory;

when the number of issues of the sticker for the predetermined part is one, transmit information about issues of the sticker to a manufacturing factory of the sticker via the communication circuit, the information about issues of the sticker including information indicating that the number of pieces of the sticker to be issued is one based on the number of issues of the sticker extracted from the memory and information indicating that a first type of the sticker is issued based on the type of the sticker or the combination of types of the stickers extracted from the memory; and when the number of issues of the sticker for the predetermined part is not one, transmit information about issues of the sticker to the manufacturing factory via the communication circuit, the information about issues of the sticker including information indicating that the number of pieces of the sticker to be issued is two based on the number of issues of the sticker extracted from the memory and information indicating that the first type of the sticker and a second type of the sticker are issued based on the type of the sticker or the combination of types of the stickers extracted from the memory, the second type being different from the first type, wherein the first type of the sticker is different in type from the second type of the sticker in any one of the followings respects: glossy or non-glossy on the sticker, colored or uncolored on the sticker, colored in multiple colors or single color on the sticker, and material of the sticker.

4. The information processing method according to claim 3, wherein
the predetermined part includes an electronic control device on which software to be upgraded by remote operation is executed.

5. A non-transitory storage medium storing a program configured to cause a computer comprising a communication circuit, and a memory storing a relationship between part numbers of a plurality of parts of a vehicle, number of issues of sticker indicating that the plurality of parts have been upgraded, and a type of the sticker or a combination of types of the stickers corresponding to the number of issues of the sticker to be issued to:

receive information about an order for the sticker for a predetermined part of the plurality of parts via the communication circuit, the information transmitted from an external device and including the part number of the predetermined part;

extract, from the memory, the number of issues of the sticker and the type of the sticker or the combination of types of the stickers corresponding the part number of the predetermined part included in the information about the order for the sticker;

determine whether or not the number of issues of the sticker for the predetermined part is one based on the number of issues of the sticker extracted from the memory;

when the number of issues of the sticker for the predetermined part is one, transmit information about issues of the sticker to a manufacturing factory of the sticker via the communication circuit, the information about issues of the sticker including information indicating that the number of pieces of the sticker to be issued is one based on the number of issues of the sticker extracted from the memory and information indicating that a first type of the sticker is issued based on the type of the sticker or the combination of types of the stickers extracted from the memory; and when the number of issues of the sticker for the predetermined part is not one, transmit information about issues of the sticker to the manufacturing factory via the communication circuit, the information about issues of the sticker including information indicating that the number of pieces of the sticker to be issued is two based on the number of issues of the sticker extracted from the memory and information indicating that the first type of the sticker and a second type of the sticker are issued based on the type of the sticker or the combination of types of the stickers extracted from the memory, the second type being different from the first type, wherein the first type of the sticker is different in type from the second type of the sticker in any one of the followings respects: glossy or non-glossy on the sticker, colored or uncolored on the sticker, colored in multiple colors or single color on the sticker, and material of the sticker.

6. The non-transitory storage medium storing a program according to claim 5, wherein
the predetermined part includes an electronic control device on which software to be upgraded by remote operation is executed.

* * * * *